Jan. 9, 1940.   F. V. BROWN   2,186,664
GLAND OR PACKING
Original Filed Aug. 27, 1937

INVENTOR
Francis V. Brown
BY
Sommers + Young
ATTORNEYS

Patented Jan. 9, 1940

2,186,664

UNITED STATES PATENT OFFICE

2,186,664

GLAND OR PACKING

Francis Victor Brown, London, England, assignor to Aircraftings Limited, Gunnersbury, London, England, a company of Great Britain Original application August 27, 1937, Serial No. 161,329. Divided and this application May 10, 1938, Serial No. 207,144. In Great Britain April 22, 1937

3 Claims. (Cl. 286—7)

This invention comprises improvements in glands or packings, for pump spindles, valve stems, such as those with longitudinal as well as rotary movements, and so on.

According to this invention, an improved gland or packing for valve stems and other cylindrical objects comprises one or a series of rings of elastic material, such as rubber or rubber composition, such ring or rings being mounted to a conical shape and inserted into a conical recess or recesses formed in the object to be packed, any recess being dimensioned to afford a certain amount of free space for its ring and the acute edge of any ring being a little proud of its recess until pressed back into such recess by contact with the cooperative object. The rings are preferably moulded so as initially to have a greater conicity than the recesses into which they are inserted and are suitably dimensioned so that whereas the acute angled peripheral edge is proud of a recess, the obtuse angled peripheral edge lies back a little from the mouth of such recess.

Figure 1:
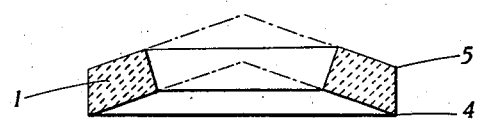
Figure 2:
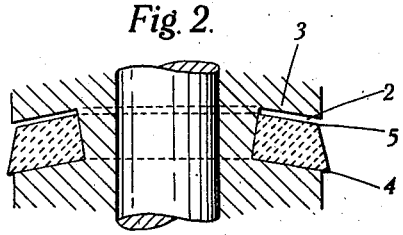
Figure 3:
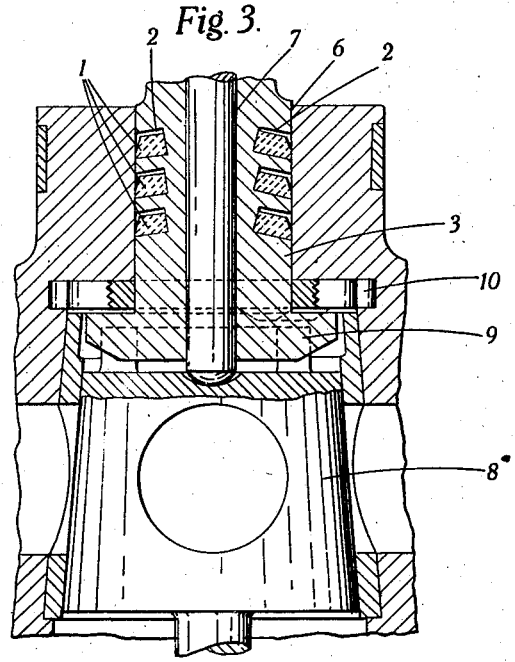

In order to enable the invention to be readily understood, reference is made to the accompanying drawing, illustrating by way of example one construction of packing ring in accordance with the invention, in which drawing:

Figure 1 is a sectional view of the packing ring,

Figure 2 is a sectional view illustrating the packing ring when inserted into an annular recess in the object to be packed, and Figure 3 is a central vertical longitudinal section, to a smaller scale than Figures 1 and 2, showing a series of packing rings inserted in the recesses of a valve stem of a rotary cock or valve of the construction described and claimed in my patent application Serial No. 161,329, filed August 27th 1937, of which this application is a division.

Referring to Figures 1 and 2, a ring I of resilient material, such as rubber or rubber composition, is moulded to conical shape and inserted into a conical recess 2 formed in the stem 3 to be packed as seen in Figure 2. The latter figure shows that the recess is dimensioned to afford a certain amount of free space for the ring I. Moreover when the ring is inserted its acute peripheral edge 4 lies a little proud of the recess, whereas the obtuse angled peripheral edge 5 lies back a little from the mouth of such recess. In the case of the valve stem or spindle in Figure 3, three conical recesses 2 and rings I are used and the degree of conicity of the recesses may vary between 10° and 20° for different sizes of spindles.

The direction of the conicity, of course, is such as to present the base of the cone towards the pressure, or towards the valve to be packed. The back wall of the groove or recess may be perpendicular to its conical walls, as shown in Figure 2, or otherwise. A conical ring, such as I, is suitably moulded so that it has a degree of conicity exceeding that of the groove into which it is to be fitted by from 5° to 7° depending upon the size. Instead of the rings being moulded with an inverted conical hole and with a vertical cylindrical periphery as in Figure 1, they may be moulded so that the wall of the hole is cylindrical and parallel with the axis and the outer peripheral wall forms part of a steep cone. In general, the maximum diameter of a ring is a few hundredths in excess of the diameter of a spindle to which it is to be applied and the thickness of such ring is a few thousandths less than the corresponding dimension of a groove into which it is to be fitted. When such a ring is slipped over a spindle and inserted into its groove, as in Figure 2, it tends to acquire the conicity of the groove. There is a little free space in the groove, however, as seen clearly in Figure 2, owing to the reduced thickness of the ring already referred to.

Referring particularly to Figure 3 the spindle 3 fitted with its three packing rings as described is inserted into its guide 6 from below, the direction of insertion being with the convex surfaces of the rings leading. As the proud peripheral portions 4 of the rings enter the cylindrical guide 6 they are pressed back into the grooves, and the peripheral compression causes distension of the inner portions of the rings. This form of packing is found to give great fluid tightness without stiffness, and it is possible to move the spindle 3 either rotatably or axially with ease. The acute angled edges 4 of the rings make a very close and licking contact with the cylindrical guide surface and prevent any leakage along the spindle 3. The result is that a very simple, effective and durable packing is provided, which is particularly advantageous for use with spindles having both rotary and axial motions. The spindle 3 is formed with a central bore for the reception of a thrust rod 7 to enable the loosening of the plug 8 by the cam action between projections 9 and a cam plate 10 as described and claimed in my patent application aforesaid.

I claim:

1. A gland or packing for sealing a shaft such as a valve stem in a surrounding body, said shaft having an annular conical recess, an elastic ring moulded to conical shape and with one peripheral edge acutely angled and the other peripheral edge obtusely angled, said ring being inserted into said recess of the shaft and dimensioned so that its obtusely angled edge lies back a little from the mouth of the recess whereas the acutely angled edge stands initially a little proud of such recess and is pressed back into the recess by contact with the inner surface of said surrounding body.

2. A gland or packing for sealing a shaft against a surrounding body comprising an elastic ring moulded to conical shape and with one peripheral edge acutely angled and the other peripheral edge obtusely angled, said shaft having an annular recess formed therein for insertion of said ring, the ring being moulded so as initially to have a greater conicity than the recess into which it is inserted and being so dimensioned that its obtuse angled peripheral edge lies back a little from the mouth of the recess whereas its acute angled peripheral edge is initially slightly proud of the recess and is pressed back into such recess by contact with the inner surface of the surrounding body, whereby the acute angled edge makes a close and licking contact with and prevents leakage along the surrounding body.

3. A gland or packing particularly suitable for sealing a valve stem of the character described against the inner surface of a surrounding body, comprising an elastic ring moulded to conical shape and with one peripheral edge acutely angled and the other peripheral edge obtusely angled, said valve stem being provided with an annular conical recess, the ring being inserted into said conical recess and the recess being wider than the ring so as to provide a certain amount of free space on that side of the ring which is adjacent to the obtuse-angled edge, and the said ring being dimensioned so that its obtusely angled edge lies back a little from the mouth of said recess whereas the acutely angled edge stands a little proud of said recess and is pressed back into the recess by contact with the surrounding body.

FRANCIS VICTOR BROWN.